United States Patent [19]

Ohtake

[11] 4,318,133
[45] Mar. 2, 1982

[54] SIMPLIFIED TYPE TELEVISION CAMERA
[75] Inventor: Yoshichi Ohtake, Kamakura, Japan
[73] Assignee: Victor Company of Japan, Ltd., Yokohama, Japan
[21] Appl. No.: 145,227
[22] Filed: Apr. 30, 1980
[30] Foreign Application Priority Data May 1, 1979 [JP] Japan .................................. 54-53646
May 1, 1979 [JP] Japan .................................. 54-53647
May 1, 1979 [JP] Japan ............................ 54-58476[U]
Jul. 13, 1979 [JP] Japan ............................ 54-96578[U]

[51] Int. Cl.³ ............................................. H04N 5/30
[52] U.S. Cl. .................................................. 358/229
[58] Field of Search ........................................ 358/229

[56] References Cited
U.S. PATENT DOCUMENTS
4,008,372 12/1977 Ueno et al. .......................... 358/229

FOREIGN PATENT DOCUMENTS
494527 10/1938 United Kingdom .
673820 6/1952 United Kingdom ................ 358/229
1170893 11/1969 United Kingdom .

Primary Examiner—Richard Murray

[57] ABSTRACT

A simplified type television camera includes an optical system comprising a main lens system, a camera (pickup) tube, and an optical viewfinder. The television camera comprises a single frame consisting of a pair of half frames respectively having opposing contact surfaces contacting with each other along a surface including an optical axis of the optical system, and holding parts for holding said optical system in a state where the pair of half frames are combined with the contact surfaces contacted.

9 Claims, 14 Drawing Figures

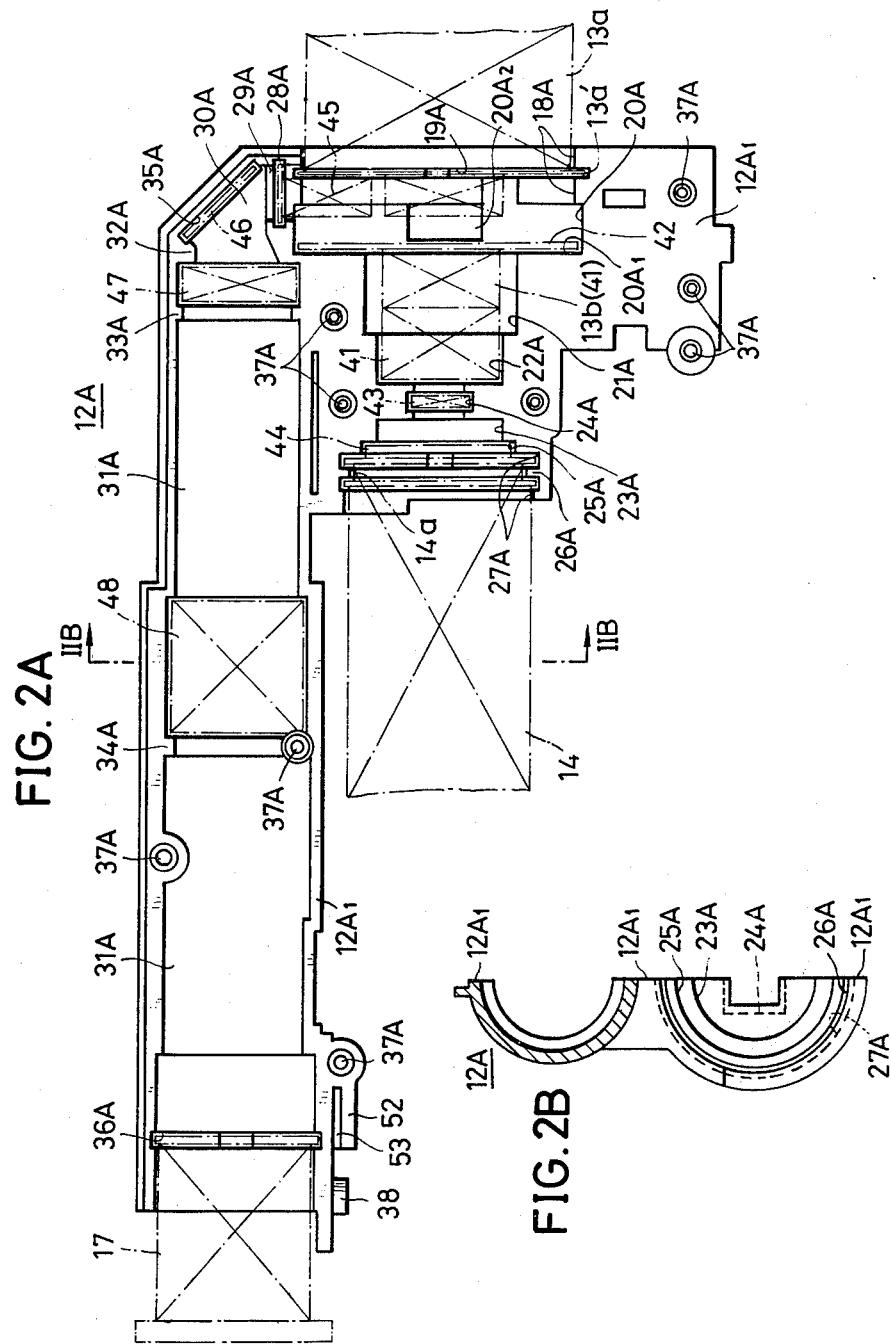

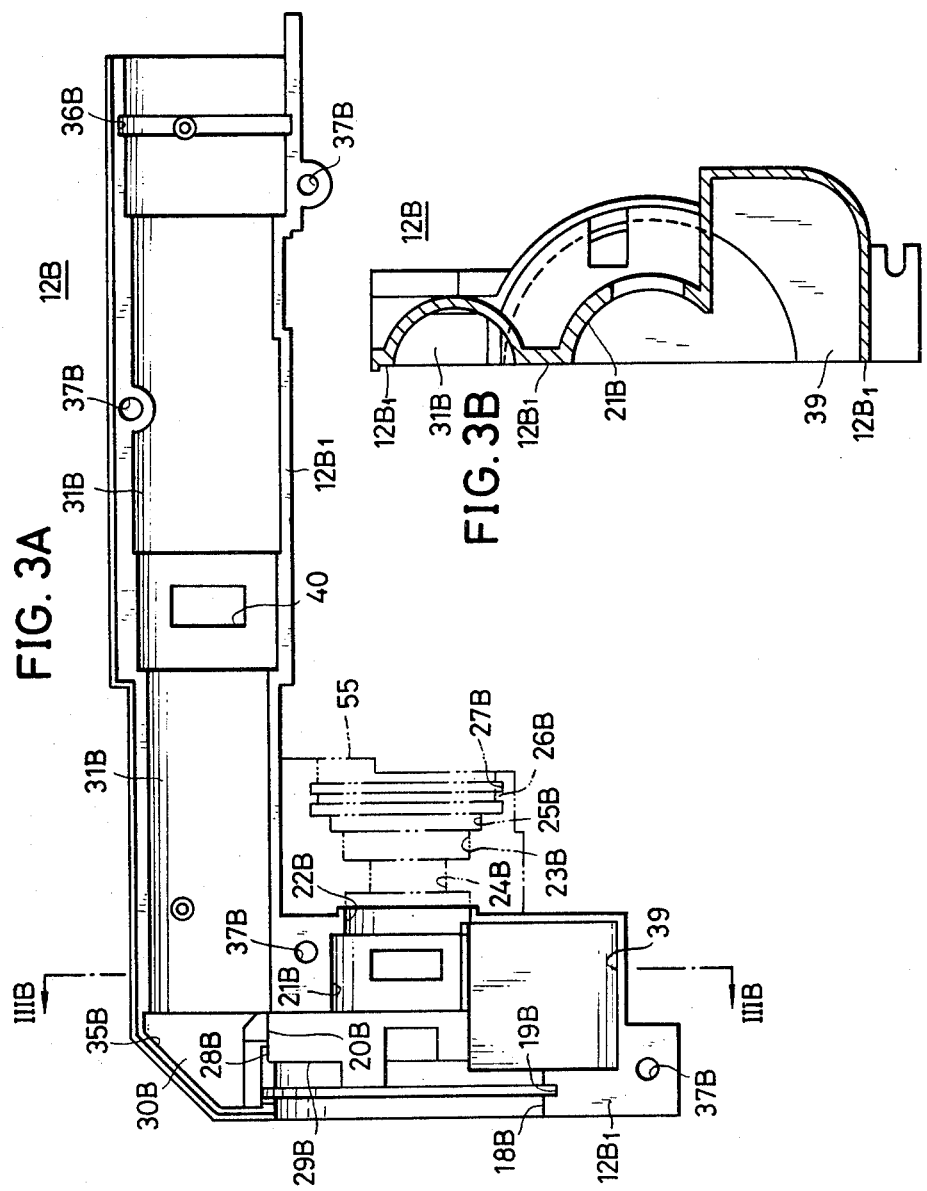

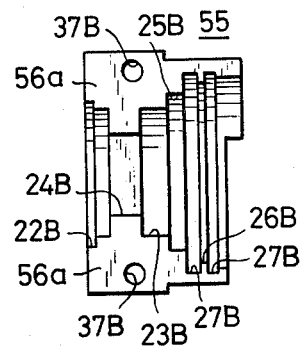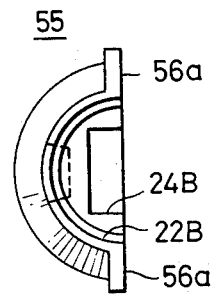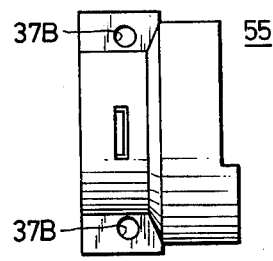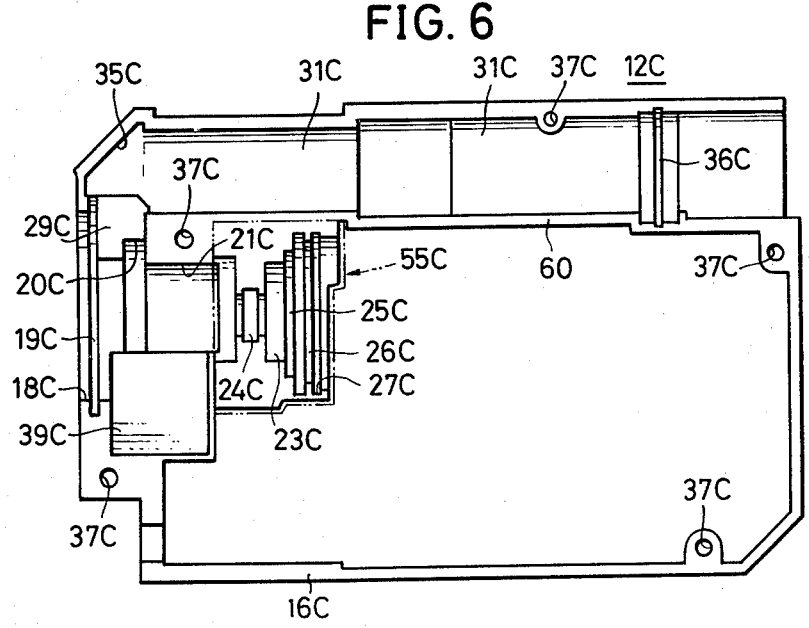

SIMPLIFIED TYPE TELEVISION CAMERA

BACKGROUND OF THE INVENTION

The present invention relates generally to simplified type portable television cameras and more particularly to a small size, light-weight, simplified type television camera of a construction wherein a main lens system, a camera (pickup) tube, and an optical viewfinder are fixedly held and supported by a single frame.

The majority of conventional television cameras of a simplified type for home use have been produced through the assembly process steps of mounting the main lens system and the camera tube separately on a holding base. This holding base is then mounted on a basic chassis, which is fixed to a cabinet. The optical viewfinder is mounted on the cabinet to which the basic chassis is fixed.

For this reason, these simplified type television cameras of known construction have been accompanied by the problems of a great number of assembly steps, a great number of parts to be adjusted, and difficulty in miniaturization and weight reduction.

Furthermore, in a television camera, the adjustment and maintenance of the camera tube recur at a frequency which is higher than the corresponding frequency for the main lens system and the optical viewfinder. For this reason, it is desirable when serviceability is considered that the camera tube can be independently attachable and detachable in a simple manner with the main lens system and the optical viewfinder of being fixed to the frame. However, simplified type television cameras known heretofore have not been of a construction affording independent attaching and detaching of the camera tube in a simple manner.

Still another problem encountered in the prior art is that, when static electricity is generated in the use of a television camera, it has an electrical effect on the camera tube, and noise is generated in the reproduced picture. However, simplified type television cameras known heretofore have not had countermeasures for overcoming this difficulty. cl SUMMARY OF THE INVENTION Accordingly, it is a general object of the present invention to provide a new and useful simplified type television camera in which the above described problems have been overcome.

Another and specific object of the invention is to provide a simplified type television camera of a construction wherein the main lens system, the camera tube, and the optical viewfinder are held and fixed by a single frame. By this feature of the simplified type television camera of the invention, the work of its assembly is facilitated, and it can be made light and of small size.

Still another object of the invention is to provide a simplified type television camera of the above described construction in which the camera tube can be independently detached after assembly. By this feature of the simplified type television camera of the invention, the advantage of easy maintenance is afforded in addition to the above described advantages.

A further object of the invention is to provide a simplified type television camera in which static electricity generated at parts such as the lenses is effectively discharged and removed.

Other objects and further features of the invention will be apparent from the following detailed description with respect to preferred embodiments of the invention when read in conjunction with the accompanying drawings.

BRIEF DESCRIPTION OF THE DRAWINGS

In the drawings:

FIGS. 2A and 2B are respectively a right side elevation of the left-side half frame of the camera and a cross section taken along the line IIB—IIB in FIG. 2A;

FIGS. 3A and 3B are respectively a left side elevation of the right-side half frame of the camera and a vertical section taken along the line IIIB—IIIB in FIG. 3A;

FIGS. 5A, 5B, and 5C are respectively side views from both sides and a front view of a camera tube holding member;

FIG. 6 is a left side elevation of the right-side half frame of a second embodiment of the simplified type television camera according to the invention;

DETAILED DESCRIPTION

Figure 1:
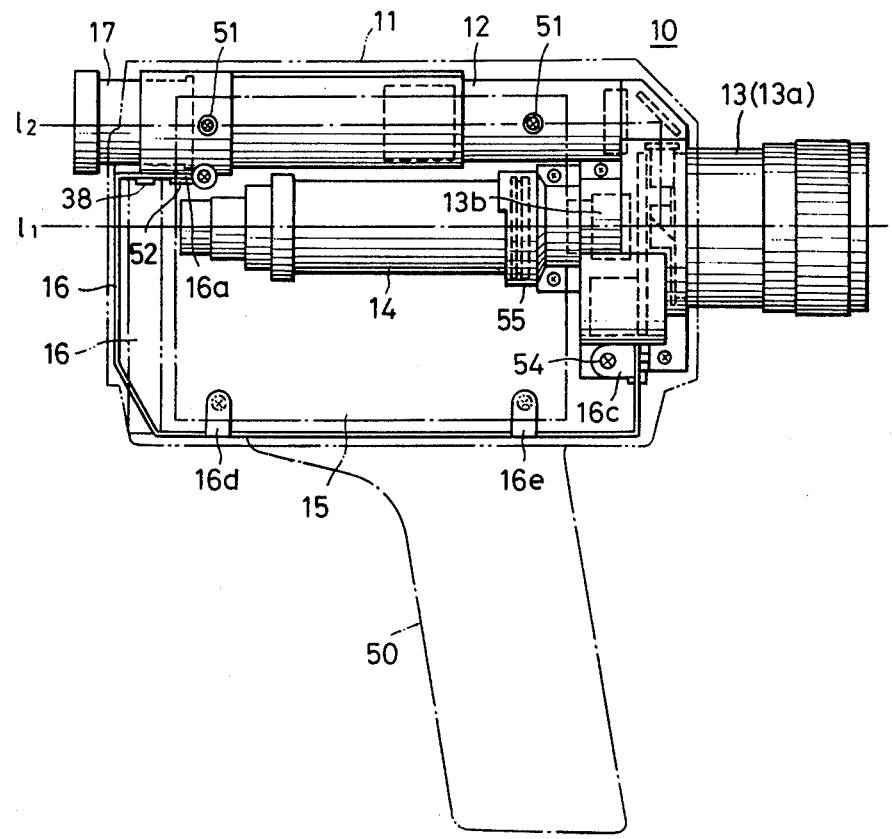
FIG. 1 is a right side elevation showing in outline form the construction of the interior of a first embodiment of the simplified type television camera according to the invention.

Referring first to FIG. 1, the principal parts of the simplified type television camera 10 shown therein are a case 11, a frame 12 mounted in the case 11, a main lens system 13, a camera (pickup) tube 14, and a base plate 15 for mounting electrical components. An L-shaped bracket 16, which is a member separate from the frame 12, is secured to and between the front and rear end parts of the frame 12. The frame 12 and the bracket 16 form a frame structure of substantially rectangular shape as viewed in side view. The bracket 16 is made of a cut and bent metal plate. The main lens system 13 comprises a zoom lens 13a, a master lens 13b for the camera tube, and other parts. For the sake of simplifying the description, the zoom lens 13a will herein be taken to represent the main lens system 13 in descriptions thereof.

The frame 12, which is a substantially L-shaped tubular structure, comprises a pair of left and right side half frames combined along a vertical plane including the optical axis of the main lens system 13 and the camera tube 14 (the plane including also the optical axis of an optical viewfinder part 17, in the case of the present embodiment of the invention). The left-side half frame 12A is shown in FIG. 2A, while the right-side half frame 12B is shown in FIG. 3A. The terms left, right, front, and rear as used herein refer to directions as viewed by the camera operator. In FIGS. 2A and 3A, those members constituting the optical system are shown by single-dot chain line.

As shown in FIG. 2A, in the front face (right side as viewed in the figure) of the left-side half frame 12A, there are formed an opening 18A for enabling an insertion of the rear part of the main lens system 13, a groove 19A for fitting a flange part (annular projection) of the main lens system 13 (this groove 19A consitituting a first holding part for fitting in the main lens system 13 to be held thereby), semicircular recesses 20A, 21A, 22A, and 23A for forming a first light path for causing light from the zoom lens 13a to form an image on the light-electric conversion surface of the camera tube 14, and a rectangular cutout 24A. To the rear (left side) of the semicircular cutout 23A, there is formed a semicircular cutout 25A for enabling an insertion of an annular elastic member for pressing leftwardly against the front surface of the camera tube 14. Further to the rear, there are formed semicircular cutouts 27A with a flange-like ridge 26A for positioning the camera tube 14, when interposed therebetween. These parts constituting a second holding part for engaging and holding the camera tube 14.

In addition, above the opening 18A, there are formed a semicircular cutout or recess 29A having a groove 28A, a recess 30A for a mirror, and a semicylindrical recess 31A. These parts form a light path for the optical viewfinder 17. In the semicylindrical recess 31A, there are formed at specific positions flange-like projections 32A, 33A, and 34A for positioning various lenses, a groove 35A for positioning a mirror, and a groove 36A for positioning the ocular lens of the viewfinder 17.

This left-side half frame 12A shown in FIGS. 2A and 2B and the right-side half frame 12B shown in FIGS. 3A and 3B are integrally secured together with screws passed through screw holes 37A and 37B. A projection 38 is provided on the lower side of the rear end of the half frame 12A is for holding the bracket 16.

In the right-side half frame 12B shown in FIGS. 3A and 3B, those parts which are the same as or equivalent to corresponding parts in the left-side half frame 12A shown in FIGS. 2A and 2B are designated by the same reference numerals but with the subscript B instead of the subscript A. Description of such parts will not be repeated.

In the right-side half frame 12B, a cavity 39 accomodates a motor for driving the lens aperture adjusting mechanism and a window 40 provides for relay lens adjustment.

The left-side and right-side half frames 12A and 12B are moulded articles of a synthetic resin such as, for example, poly-phenilene oxide (PPO) (tradename "Noryl" produced by Engineering Plastic Ltd.) containing glass, and are fabricated with amply high dimensional precision.

Furthermore, in the right-side half frame 12B, a part corresponding to the second holding part for the camera tube in the above described left-side half frame 12A is not formed. This second holding part, as a holding member 55 shown in FIGS. 5A, 5B, and 5C, is formed as separate part in the right-side half frame 12B.

The holding member 55 has a shape substantially symmetrical with the second holding part of the left-side half frame 12A. In each of these figures, those parts which correspond to constituent parts shown in FIGS. 2A and 2B and which perform the same functions as those parts are designated by the same reference numerals with the subscript B. A description of such parts will not be repeated. A recess is not formed in the rectangular cutout 24B. This cutout 24B functions, when the holding member 55 is mounted, to hold a projection of the optical low-pass filter which is inserted in the groove of the rectangular cutout 24A and is thereby locked in position to limit the movement and detaching of this optical low-pass filter.

The holding member 55 functioning as the second holding part may be formed integrally with the right-side half frame 12B. In this case, the holding member 55 is formed integrally at a position shown by a two-dot chain line in FIG. 3A.

Next, the process of mounting the main lens system 13 and the camera tube 14 on the above described frame and the assembling the television camera will be described.

First, the zoom lens 13a is mounted on the front part of the left-side half frame 12A. This mounting is carried out by inserting the rear flange 13a' of the zoom lens 13a into the groove 19A (first holding part) and, moreover, fitting the cutouts around the periphery of the flange into engagement with projections in the groove 19A. The zoom lens 13a is locked in position with respect to its optical axis direction and its circumferential direction. In this case, because the left-side half frame 12A is formed with good dimensional precision, the zoom lens 13a is assembled into place in a state requiring almost no fine adjustment. In the case where the clearance between fitted parts is relatively large because of production requirements, a material such as metal foil or vinyl tape may be inserted into the groove 19A to cause the material to be clamped between a flange and the half frame thereby accomplish an assembly without play. Furthermore, this first holding part may be provided with a fine adjustment mechanism using parts such as a set screw.

Continuing with the assembly, a master lens 41 for the camera tube is inserted into the semicircular cutouts 20A, 21A, and 22A. This master lens 41 has an annular flange or plate 42 fixed thereto. The master lens 41 is clamped and positioned by the insertion of the peripheral part of the annular plate 42 between the rear wall surface 20A$_1$ of the cutout 20A and the projection 20A$_2$. An optical low-pass filter 43 is inserted within the rectangular cutout 24A.

Then, in mounting the camera tube 14, an elastic annular structure 44 is inserted into the cutout 25A. Thereafter, the camera tube 14 is fitted into the cutout 27A, which is the second holding part, overcoming the elastic counterforce of the elastic annular structure 44. At this time, the flange projection 26A fits into the annular groove 14a of the front flange of the camera tube 14. At the same time, the camera tube 14 is urged to move leftwardly as viewed in FIG. 2A, by the elastic force of the elastic annular structure 44. As a consequence, the camera tube 14 is fixed in its mounting position by the flange projection 26A of the half frame 12A.

Further, a master lens assembly 45 for the viewfinder is mounted in the cutout 29A by fitting its flange into the groove 28A. A field lens assembly 47 and a relay lens assembly 48 are respectively fitted between the flange projections 32A and 33A and between a stepped part of the semicylindrical cavity 31A and the flange projection 34A. In addition, a flange part of the ocular lens assembly is fitted into the groove 36A. By this procedure, the various lenses of the optical viewfinder are positioned in the left-side half frame 12A and are tentatively held. At the time of fitting and holding the various lenses of the optical viewfinder, depending on the necessity, the assembly may be carried out in a state wherein a material such as metal foil or vinyl tape is interposed between parts similarly as in the above described case of the above described case of holding the zoom lens. By this measure, the various lenses are tentatively held without play.

Next, the right-side half frame 12B, in which a motor (not shown) has been inserted and fixed, is lowered with appropriate positioning onto the left-side half frame 12A, in which the above described main lens system 13, the camera tube 14, and the various lenses for the optical viewfinder have been tentatively held. As a result, the above mentioned main lens system 13, camera tube 14, and various lenses for the optical viewfinder are respectively fitted relatively into the groove 19B, the semicircular cutouts 20B, 25B, and 26B, the grooves 28B, 35B, 36B, etc. The confronting surfaces 12A$_1$ and 12B$_1$ of the two half frames 12A and 12B are brought into mutual contact.

In addition, the holding member 55 is lowered with appropriate positioning onto the second holding part of the left-side half frame 12A. As a result, the optical low-pass filter 43, the elastic annular structure 44, and the camera tube 14 are tentatively held in the left-side half frame 12A. These parts fit relatively into the rectangular cutout 24B and the semicircular cutouts 25B and 27B of the holding member 55. The confronting surface 56a of the holding member 55 is brought into contact with the confronting surfaces 12A$_1$ of the left-side half frame 12A.

Next, the left-side and right-side half frames 12A and 12B are thus brought into contact where they are fixed together by screws. At the same time, the holding member 55 is fixed by screws to the left-side half frame 12A. As a result, the main lens system 13, the camera tube 14, and the optical viewfinder comprising the lens assemblies 45, 47, 48, and 17 are fully fixed and held by the single frame 12 which is made up of a pair of half frames 12A and 12B.

In this case, since the holding member 55 is a member separate from the right-side half frame 12B, it can be detached independently, by itself, from the left-side half frame 12A, merely by removing screws. Accordingly, when the camera tube 14 is to be adjusted, only the screws for the holding member 55 are unsrewed to detach this member 55. Only the camera tube 14 is taken out with the main lens system and the various lenses of the optical viewfinder, when in the state of being fixed to and held between the pair of half frames 12A and 12B. As a result, an adjustment or replacement of the camera tube assembly, after assembly or after completion of the television camera, can be easily carried out without affecting the main lens system and other assemblies, whereby maintenance and serviceability are improved.

In the above described embodiment of the invention, while the holding member 55 is a part made completely separate from the left-side and right-side half frames 12A and 12B, its construction need not be so restricted. For example, the holding member 55 may be of a construction where it is formed unitarily with either half frame 12A or 12B by way of a hinge member of this material.

Next, the procedure of mounting the base plates 15 for mounting electrical components, the bracket 16, and a grip 50 on the above described frame 12 will be described.

First, before the bracket 16 is mounted, a pair of base plates 15 are tentatively mounted with screws on the two sides of the frame 12 by utilizing a mounting part 51 of the frame 12. At this time, the free end sides of the pair of base plates 15 are open since there is no bracket 16. The worker carrying out the assembly can easily reach into the space between the two base plates to carry out wiring, whereby work such as wiring can be readily and efficiently carried out.

After the wiring work, the bracket 16 is mounted on the frame 12. The tentative attachment of this bracket 16 can be readily carried out by fitting into engagement the recesses and projections of the bracket 16 and the frame 12.

Figure 4A:
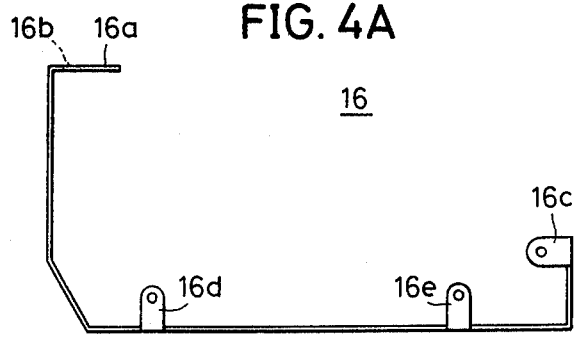
FIGS. 4A and 4B are respectively a side view of a bracket and a plan view of one part thereof.
Figure 4B:
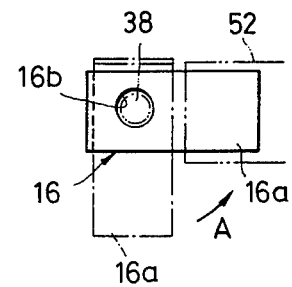

First, as shown by a two-dot chain line in FIGS. 1 and 4B, the bracket 16 is so orientated that its longitudinal direction is perpendicular to the longitudinal direction of the frame 12. A hole 16b is formed on one bent end part 16a and is fitted onto the projection 38 of the frame 12 (i.e., the half frame 12A). With these parts in this state, the bracket 16 is rotated through an angle of approximately 90 degrees relative to the frame 12, with the rotation being in the arrow direction A, as indicated in FIG. 4B, about the engagement parts of the hole 16b and the projection 38. As a consequence, the extreme end part of the bent part 16a of the bracket 16 forcibly enters the gap 53 between a flange projection 52 of the frame 12 (left-side half frame 12A) as shown in FIG. 2A and assumes a state as indicated by solid line in FIG. 4B. A bent flange part 16c, at the other end of the bracket 16, comes into contact with the right-side half frame 12B. As a consequence, the bracket 16 is tentatively held to the frame 12 without the use of screws or the like. Even when the frame 12 is lifted and handled, the bracket 16 does not become disconnected from the frame 12. By rotating the bracket 16, when in this state, in the direction opposite to the arrow direction A, it is also possible to disconnect the bracket 16 from the frame 12.

The bracket 16, tentatively held in the above described manner, is fixed at its bent flange part 16c by a screw 54 to the frame 12. The plates 15 for mounting of electrical components are secured by screws to flanges 16d and 16e of the bracket 16, to complete their mounting.

Further, the grip 50 is secured to the bracket 16. The exterior plates are secured to the frame 12 and bracket 16, whereupon the assembly of the television camera is completed.

In the case where, after assembly, adjustment, servicing, or some other work is to be carried out, the various parts are detached in a sequence which is the reverse to that described above. Thus, work, such as repair of the wiring and replacement of the camera tube, can be carried out relatively easily.

The assembly of the bracket 16 is made of a metal plate material. This bracket can be tentatively held in a more firm manner by causing it somewhat forcibly to deflect, to bring its two ends in its longitudinal direction closer to each other or to move these ends further apart, thereby to cause an elastic force to be stored in the bracket 16, and then tentatively securing the bracket 16, while in this deflected state, to the frame 12.

In the simplified type television camera according to the present invention, the main lens system, the camera tube, and the optical viewfinder are integrally held by a single frame. For this reason, the labor required in its assembly process can be effectively reduced, whereby the assembly is facilitated. At the same time, the portable television camera can be miniaturized and reduced in weight. Furthermore, the above mentioned single frame is of a construction wherein it is assembled by bringing into mutual contact, in opposed states, a pair of half frames along a plane including the optical axis of the main lens system. For this reason, at the time of assembly, adjustment, or like work, the main lens system, the camera tube, and like parts can easily be secured tentatively to one of the half frames. Accordingly, assembly and adjusting work can be carried out stably. Furthermore, the mounting and replacing of the main lens system, the camera tube, and other parts can be readily carried out.

Another feature of the portable television camera of the invention is that, by moulding the half frames from synthetic resin, they can be produced at low cost and as moulded articles of high dimensional precision. Accordingly, there is almost no necessity of finely adjusting the main lens system, the camera tube, and the optical viewfinder once they are mounted and assembled. Still another feature is that, by adapting the frame so that the light path forming part for the optical viewfinder is formed integrally with the frame itself, there is no necessity of especially mounting a light path forming part on the frame. At the same time, a light path forming part can be provided with high dimensional precision.

A further feature of this television camera is that the synthetic resin moulded frame of substantially L-shape for holding the main lens system and the camera tube and the substantially L-shaped bracket mechanically connected to this frame together form a camera box structure of a substantially rectangular shape. For this reason, the camera production cost is lower than the cost where the bracket and the frame are integrally formed. Moreover, since the bracket is a structure separate from the frame, work procedures such as wiring during production and work such as inspecting and servicing after production are facilitated and can be carried out efficiently.

Furthermore, since fitting together of recesses and projections is utilized in the mounting of the bracket relative to the frame, the mounting can be carried out in a simple manner without the use of screws or the like, and the number of required parts can be reduced. Further, by forming a part for holding the optical viewfinder in the frame itself, and by disposing the plates for mounting of electrical components on the two opposite sides of the frame, a miniaturization of the camera can be effectively realized.

A still further feature of this television camera is the construction wherein, with the main lens system and the optical viewfinder fixed and held, the camera tube can be independently mounted and detached. This feature makes possible the disconnection, adjustment, replacement, and other work on only the camera tube without disturbing the assembled main lens system and the optical viewfinder.

A second embodiment of the simplified type television camera, according to the present invention, is illustrated in FIG. 6, showing the right-side half frame thereof. In this right-hand half frame 12C, those parts which are the same as the corresponding parts in the aforedescribed right-side half frame 12B are respectively designated by like reference numerals with the subscript C instead of B. A description of such parts will be omitted. Differing from the construction of the preceding embodiment of the invention, wherein the bracket 16 and the frame 12 are mutually separate structures, the construction of this right-side half frame 12C is such that the bracket 16C is formed integrally with half frame structure 60. In the case where this half frame 12C is used, the aforedescribed desirable results are also obtained.

Figure 7:
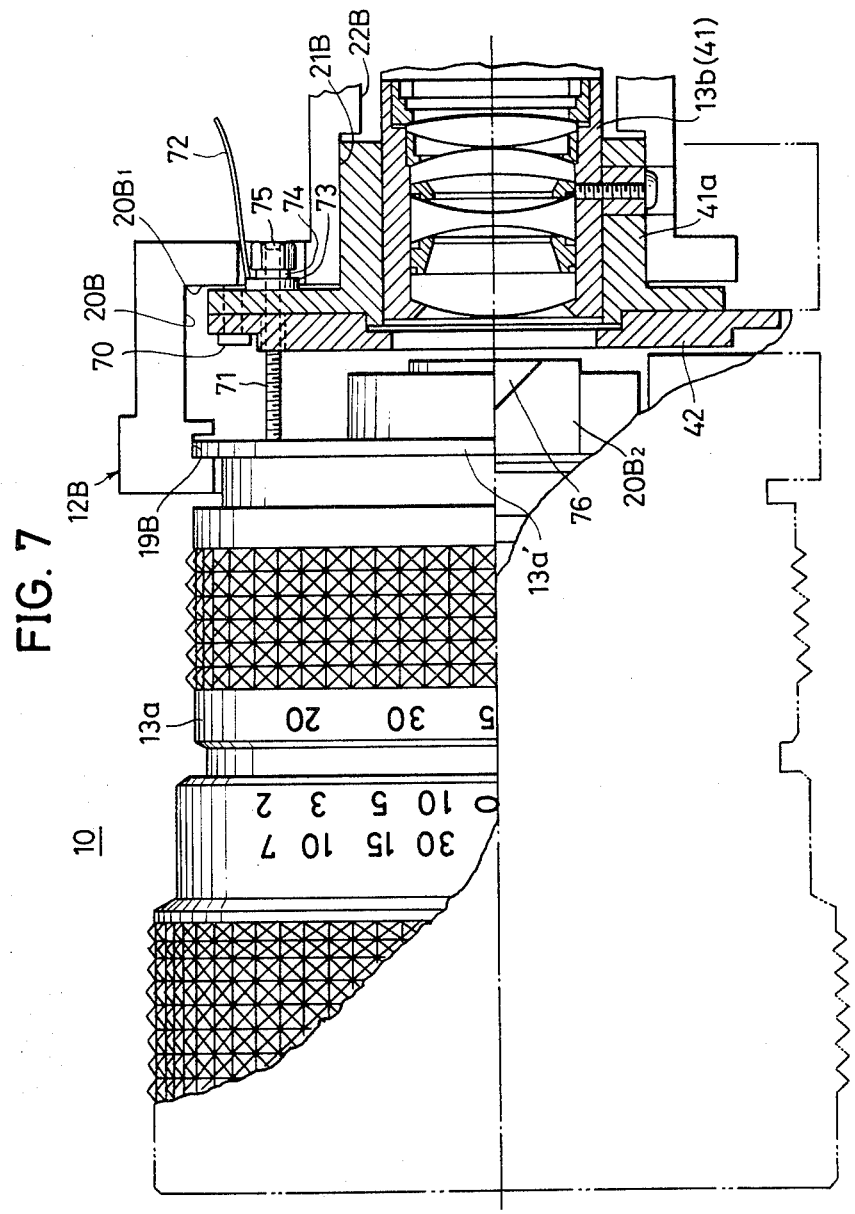
FIG. 7 is a side view, with parts cut away and parts shown in longitudinal section, of essential parts of a third embodiment of the simplified type television camera according to the invention.
Figure 8A:
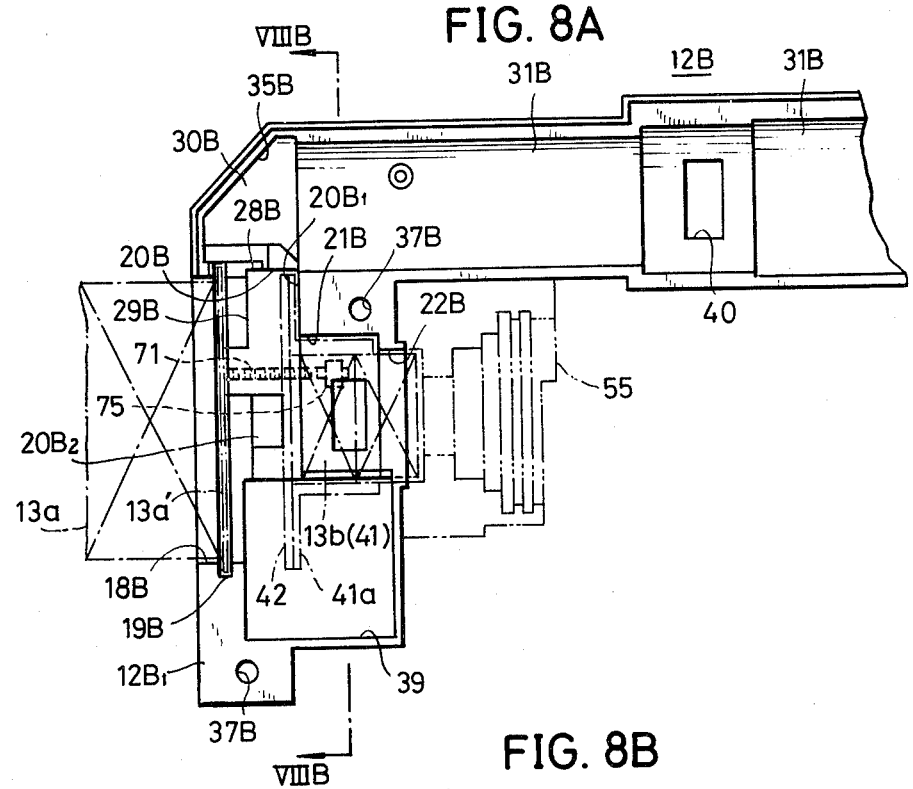
FIGS. 8A and 8B are respectively a left side elevation of a half frame and a cross section taken along the line VIIIB—VIIIB in FIG. 8A.
Figure 8B:
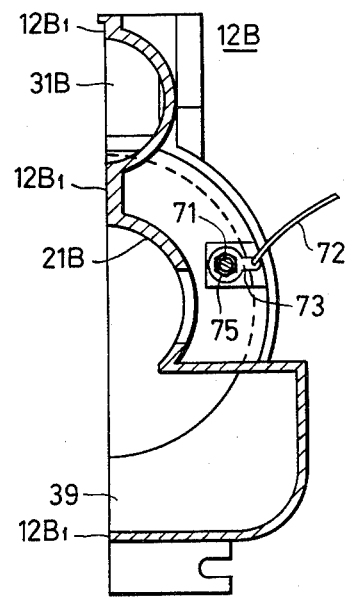

An embodiment of the invention, is of a construction which is capable of discharging static electricity and is shown in FIGS. 7, 8A, and 8B. In this embodiment of the invention, those parts which are the same as corresponding parts in the above described embodiments of the invention are respectively designated by reference numerals. A description of such parts will not be repeated, and only those parts which are different from previously described parts will be described.

At the time of assembly, the master lens 41 for the camera tube (i.e., a master lens holder 41a) is inserted into semicircular cutouts 20A, 21A, and 22A. An annular plate 42 is fixed by a screw 70, which is described hereinafter, to a flange part of this master lens holder 41a. By inserting the peripheral parts of the flange of this master lens holder 41a and the annular plate 42 between the rear wall surface $20B_1$ of the cutout 20B and the projection $20B_2$, these parts are clamped in a substantially positioned state. Further, the positions of the zoom lens 13a and the master lens holder 41a are mutually adjusted with high precision, by means of a set screw 71. At the same time, a discharging of static electricity takes place. The rear end flange part 13a' of the zoom lens 13a is fitted into the groove 19B. A specific clearance is formed between the flange part 13a' and a wall of the groove 19B.

As shown in FIG. 7, to the master lens holder 41a of the master lens 41, the above mentioned annular plate 42 is fixed by the screw 70. A specific aperture adjusting mechanism and an aperture adjusting motor (both not shown) are mounted on this annular plate 42. The above mentioned set screw 71, which is made of an electroconductive material, is screw engaged from the outer part of the frame 12 to the master lens holder 41a and is inserted through and projected past a loose hole in the annular plate 42.

As the set screw 71 is turned and advances by its screw engagement, its tip abuts against the flange part 13a' of the zoom lens 13. Thus, an adjustment of the position in the axial direction of the zoom lens 13a, roughly positioned as described hereinbefore, and an adjustment of the rotational position of a prism 76, to be described hereinafter, are accomplished with high accuracy. Then, by further tightening the set screw 71, the fixing in place of the zoom lens 13a and the fixing in place of the master lens 41 relative thereto are effected.

The prism 76 for the optical viewfinder is disposed to the right as viewed in the figures of the zoom lens 13a and requires fine adjustment of rotational position about the optical axis of the zoom lens 13a. This prism 76 rotates unitarily with the zoom lens 13a when the zoom lens is manually rotated. At a specific rotational position, its rotational direction position is readily adjusted and fixed with high accuracy by adjusting and tightening the engagement of the set screw 71 in FIG. 8B.

Then, as indicated in FIGS. 7 and 8B, a metal spacer 73, to which a grounding (earthing) line 72 is connected, is fitted into engagement with the part of the set screw 71 projecting outward from the frame 12 and thereafter is fixed by a lock washer 74 and a nut 75. By this procedure, the flange part 13a' of the zoom lens 13a and the master lens holder 41a are respectively connected electrically to the grounding line 72 via the set screw 71. Accordingly, in the event that this television camera 10 is used in a strong electric field, or the zoom lens 13a is manually operated, whereby static electricity is generated at the flange part 13a' of the zoom lens 13a and the master lens holder 41a, this static electricity will be discharged through the set screw 71 and the grounding line 72. There is no possibility of the static electricity having a disturbing effect on the camera tube 14 to give rise to a defective operation, such as noise in the reproduced picture.

Further, this invention is not limited to these embodiments but variations and modifications may be made without departing from the scope of the invention.

What is claimed is:

1. A simplified type television camera including a flanged modular optical system comprising a main lens system, a camera (pickup) tube, and an optical viewfinder, said television camera comprising a single frame consisting of a pair of half frames respectively having opposing contact surfaces contacting with each other along a surface including an optical axis of the optical system and holding parts for independently holding the modules of said optical system by their flanges in a state where the pair of half frames are combined with the contact surfaces contacted and said modules can be removed from said camera without disassembling said camera.

2. A simplified type television camera is claimed in claim 1 in which the pair of half frames are moulded by synthetic resin.

3. A simplified type television camera as claimed in claim 1 in which the pair of half frames having respectively light path forming paths for forming a light path for the optical viewfinder in a state where the pair of half frames are combined with the contact surfaces contacted.

4. A simplified type television camera as claimed in claim 1 in which each of said half frames comprises first and second holding parts for holding respectively a part of the main lens system and a part of the camera tube, a light path forming part for forming a light path introducing a light separated from the light passed through the main lens system, separately from a light path from the main lens system to the camera tube, and a third holding part for holding the optical viewfinder in relation to the light path.

5. A simplified type television camera as claimed in claim 4 in which said first, second, and third holding parts are integrally formed with each of the half frames.

6. A simplified type television camera as claimed in claim 4 in which one of the half frames has the first, second, and third holding parts integrally formed therewith, while the other of the half frames has the first and third holding parts integrally formed therewith and the second holding part which can hold the camera tube and release it in a state where the pair of half frames are combined.

7. A simplified type television camera as claimed in claim 1 in which said frame has a substantially L-shaped configuration, and which further comprises a bracket of a substantially L-shaped configuration of which both ends are fixed to both ends of the frame and which constitutes a substantially rectangular external configuration together with said frame.

8. A simplified type television camera as claimed in claim 7 which further comprises a base plate for mounting electrical components of circuits for electrically processing an output signal of the camera tube thereon, and in which said bracket has mounting parts for mounting the base plate thereto.

9. A simplified type television camera as claimed in claim 1 which further comprises a member for adjusting a position of the main lens system, said member being made of electrically conductive material and passing through a part of the frame and contacting a part of the main lens system, and a grounding line electrically connected to the member and discharging static electricity of the main lens system to outside of the main lens system.

* * * * *